(12) United States Patent
Nakagawa (10) Patent No.: US 6,246,829 B1
(45) Date of Patent: Jun. 12, 2001

(54) RECORDING MEDIUM DRIVER

(75) Inventor: Kenzo Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/057,870

(22) Filed: Apr. 9, 1998

(30) Foreign Application Priority Data

Apr. 11, 1997 (JP) ................................................ P09-094169

(51) Int. Cl.$^7$ ..................................................... H04N 5/91
(52) U.S. Cl. ............................................. 386/95; 386/126
(58) Field of Search ................................... 386/1, 45–46, 386/95, 94, 125–126; 360/15, 31, 69, 72.2

(56) References Cited

U.S. PATENT DOCUMENTS

| | | | |
|---|---|---|---|
| 5,239,426 | * 8/1993 | Sakaegi | 360/69 |
| 5,835,670 | * 11/1998 | Hirayama et al. | 386/125 |
| 5,907,446 | * 5/1999 | Ishii et al. | 360/72.2 |

* cited by examiner

*Primary Examiner*—Wendy R. Garber
*Assistant Examiner*—Christopher Onuaru
(74) *Attorney, Agent, or Firm*—Oblon, Spivak, McClelland, Maier & Neustadt, P.C.

(57) ABSTRACT

A recording medium includes a user data area (UDA) for writing real data and a program memory area (PMA) for writing management data. In the PMA, a repetitive writing operation number NA of the UDA, write end address AE, operation life number NL and final address AL, etc. are written. On the occasion of recording real data to the UDA, writing is started from the address next to the write end address AE at the time of the preceding recording operation and after the recording is executed up to the final address AL, data writing is started again from the start address to give an increment of one (1) to NA. The real data is written in average up to the final address from the start address of UDA. When NA exceeds NL, a warning is displayed and the recording medium (e.g. a disc) ejected. Therefore, the recording medium's operational life is extended and the safety of data written to the UDA is assured.

13 Claims, 6 Drawing Sheets

| PMA WRITING NUMBER NP | REAL DATA WRITING NUMBER NA | WRITE END ADDRESS AE | PMA TRANSFER FLAG FM |
|---|---|---|---|
| | (OPERATION LIFE NUMBER NL) | (FINAL ADDRESS AL) | (PMA NUMBER $n_{max}$) |
| RECORDING FLAG FR | | | |

RECORDING MEDIUM DRIVER

BACKGROUND OF THE INVENTION

1. Field of the Invention

The present invention relates to a recording medium driver suitable for application to a disc apparatus utilizing, for example a phase change type disc.

2. Description of the Related Art

A magneto-optical disc and a phase change type disc have been proposed as the reprogrammable recording media and in these reprogrammable recording media, when the number of times of writing operation increases, the recording layer is gradually deteriorated and finally safety for data writing can not be assured. The number of times of the writing operations which can no longer assure the safety of data writing, namely the writing operation life, is considerably expanded in a magneto-optical disc. However, the writing operation life of the phase change type disc is less than that of the magneto-optical disc.

As explained above, when the number of times of write operation reaches the writing operation life, safety of data writing can no longer be assured.

SUMMARY OF THE INVENTION

Therefore it is an object of the present invention to expand the operation life of a recording medium by averaging the number of times of write operation to each address of the real data area of recording medium and also assure the safety of read data writing operation to the real data area.

The recording medium driver of the present invention writes, on the occasion of writing real data up to the final address of the real data area, the subsequent real data from the first address of the real data area and writes the real data writing times information indicating the number of times of write operation of the real data area into the management data area as the management data and also writes the write end address indicating the end of write operation into the management data area as the management data after the end of write operation of the real data to the real data area.

On the occasion of starting the writing of real data in the real data area, data writing is started from the address next to the address indicated by the write end address written into the management data area of a recording medium and the write end address is written as the management data into the management data area when the data writing is completed. Thereby, the writing of real data for the first address to the final address of the real data area of the recording medium can be averaged. The number of times of data writing is increased by one, for example, when the real data is written up to the final address of real data area and thereafter data is written again from the first address. Since the number of times of data writing operation is limited under the predetermined number of times, for example, under the operation life, safety of the real data writing operation for the real data area can be assured.

When the number of times indicated by the data writing number information recorded in the management data area of the recording medium exceeds the predetermined number of times prior to the real data writing to the real data area, writing of real data to the read data area where safety of data writing is not assured can be avoided, if a warning is issued, for example, by warning means or the recording medium is ejected from the apparatus body.

In the case where two or more management data areas are provided in the recording medium and the number of times of management data writing operation to the management data area under the attention is exceeding the predetermined number of times, for example, the operation life number, it is also possible to write the management data to the other management data area. In general, the number of times of management data writing operation to the management data area is higher than the number of times of data writing operation to the real data area, but when two or more management data areas are provided and sequential transfer is made to the effective management data areas, safety of the management data to be written into the management data areas can be assured. In this case, it is also possible that the transfer flag is written in order to indicate whether the effective management data area is shifted or not to the next management data area of the recording medium and thereby the effective management data area can be discriminated by checking the transfer flag of each management data area, for example, at the time of loading of the recording medium.

Moreover, it is also possible that a recording flag is written into the management data area of the recording medium to correct, when the recording flag is ON, the real data writing number information and management data writing number information to be increased by one, for example, at the time of loading the recording medium or the recording flag is turned ON when the recording flag is OFF. Thereby, it can be covered that the recording medium is ejected from the apparatus without rewriting of the management data to the management data area of the recording medium, in the case where the medium is ejected by means of the high speed eject means, for example. Accordingly, when the management data for the management data area of the recording medium is updated, the recording flag is reset to the OFF state.

Moreover, the recording medium may be a disc type recording medium such as magnetic disc, magneto-optical disc and phase change type disc. In this case, access can be made easily to the management data area and real data area and when the real data is started to be written to the real data area, the writing can easily be started from the address next to the write end address. As the real data to be written into the real data area of the recording medium, an video data corresponding to the video signal obtained by processing the image pickup signal output from an image pickup element may be used. For example, in the case of recording an image without any selection, amount of video data to be written to the real data area of the recording medium becomes very large but, as explained above, the operation life of the recording medium can be extended by writing the video data in average up to the final address from the start address of the real data area of the recording medium.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF THE PREFERRED EMBODIMENTS

Figure 1:
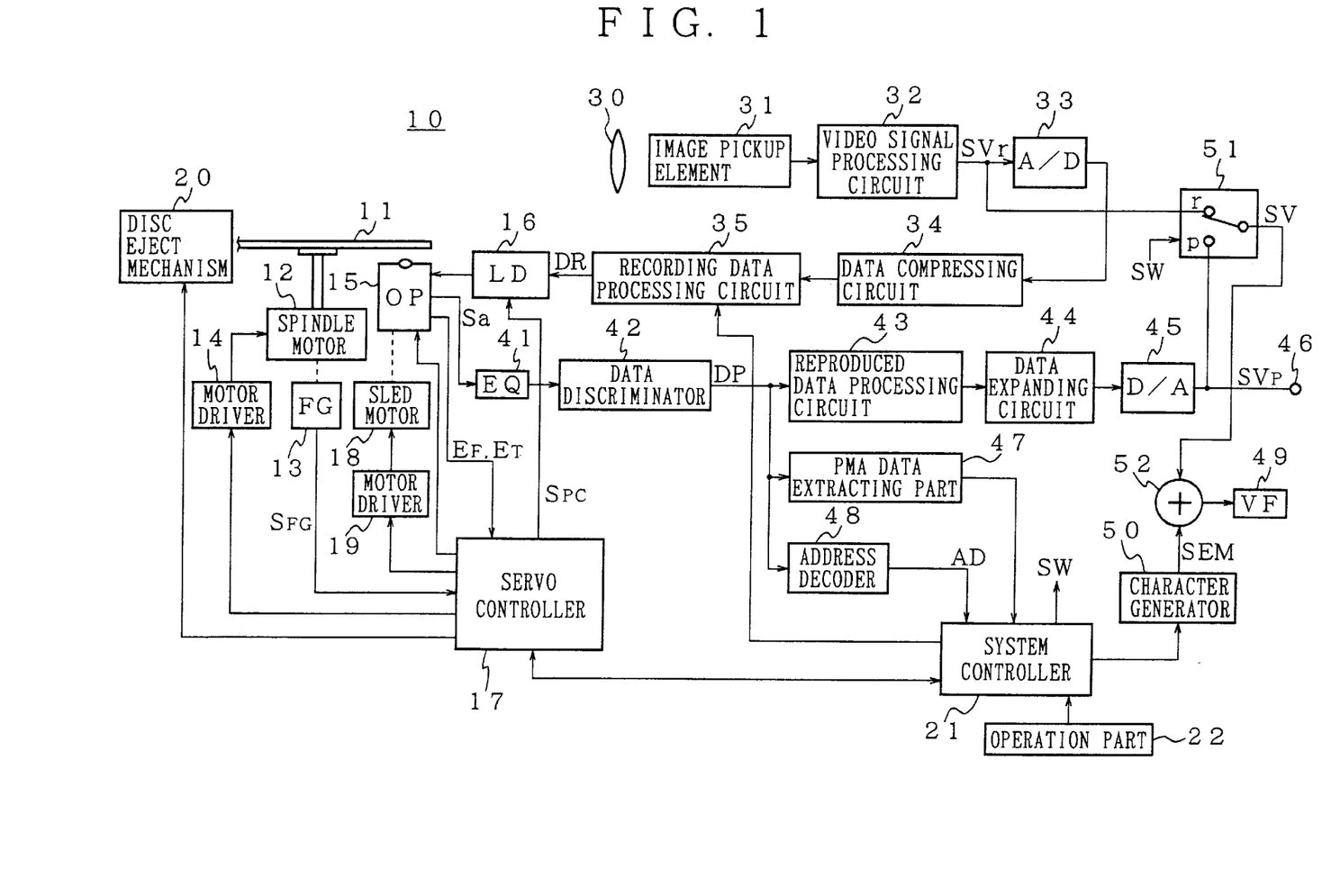
FIG. 1 is a block diagram showing a structure of a camera-integrated disc apparatus as a preferred embodiment of the present invention.

Preferred embodiments of the present invention will be explained with reference to the accompanying drawings. FIG. 1 shows a camera-integrated disc apparatus 10 as a preferred embodiment of the present invention.

This disc apparatus 10 comprises a spindle motor 12 for rotating a phase change type disc 11, a frequency generator 13 being attached to the rotating shaft of the motor 12 to generate a frequency signal SFG as the rotation information of the motor 12 and a motor driver 14 for driving the motor 12. The frequency signal $S_{FG}$ output from the frequency generator 13 is supplied to a servo controller described later and operation of the motor driver 14 is controlled by the servo controller.

Figure 2A:
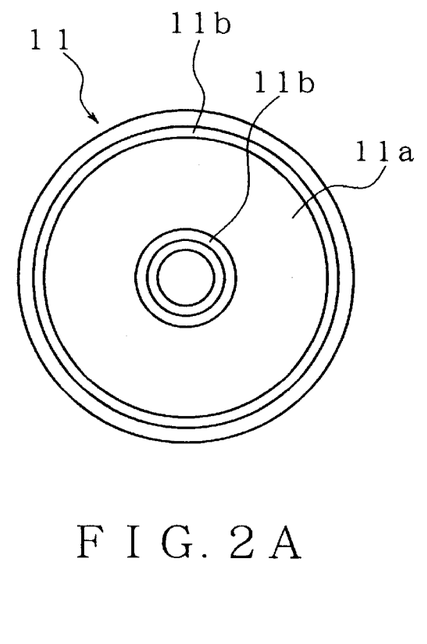
FIGS. 2A and 2B are diagrams showing arrangement examples of a program memory area (PMA) of a disc.
Figure 2B:
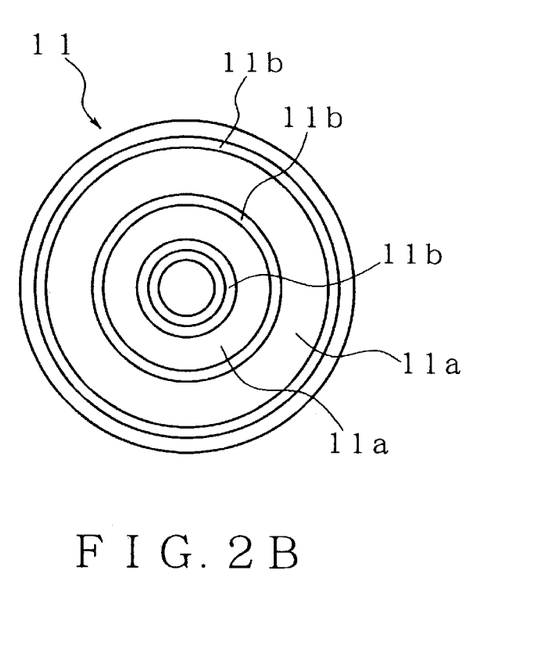

The phase change type disc 11 includes a user data area (hereinafter referred to as "UDA") as the real data area 11a and a program memory area (hereinafter referred to as "PMA") 11b as the management data area. The disc 11 is provided with two or more PMAs 11b. For example, as shown in FIG. 2A, the PMA 11b is provided in two areas near the innermost circumference and outermost circumference of the disc 11. Moreover, as shown in FIG. 2B, for example, such PMA 11b is provided in three areas including such areas near the innermost circumference and outermost circumference of the disc 11 and the intermediate area between such two areas.

Figure 3:
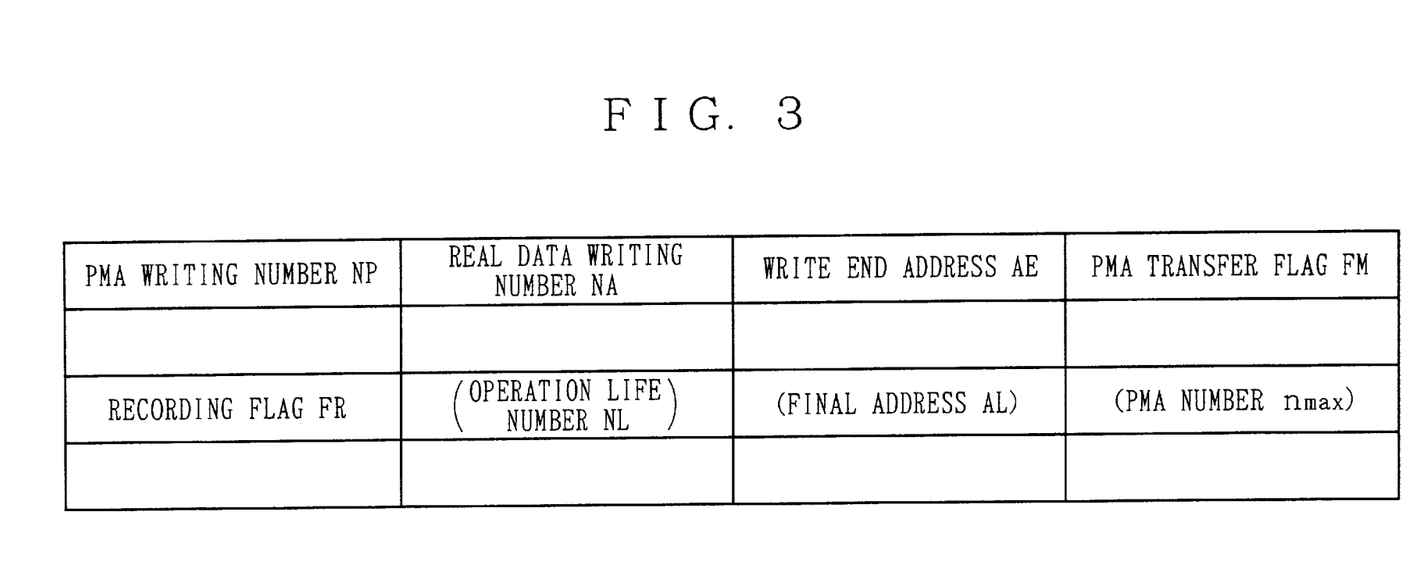
FIG. 3 is a diagram showing a table example of a program memory area (PMA) of a disc.

In the UDA 11A, the real data, namely the recording video data DR in the case of this embodiment as explained later is written. As shown in FIG. 3, the information of the management data writing number (PMA writing number) NP in the PMA 11b, information of the repetitive real data writing number (real data writing number) NA in the UDA 11a, write end address AE indicating the address where the real data writing in the UDA 11a is completed, PMA transfer flag FM indicating whether the effective PMA 11b is transferred to the next position or not, a recording flag FR indicating whether correction for increasing the values of NP, NA by only one should be done or not at the time of loading of the disc 11, information of the operation life number NL for limiting the NA so that the safety for real data writing to the UDA 11a, the final address AL of the UDA 11a and information of the number nmax of PMAs 11b are written to the PMA 11b as the management data. However, when the NL, AL, nmax given in the parentheses ( ) indicate the predetermined values, it is not required to previously write the values in the PMA 11b and it may be stored, for example, in the ROM (Read Only Memory) comprised in the system controller describe later. Moreover, the PMA writing number NP and repetitive writing number NA in the PMA 11b of the disc 11 unused are respectively set to 1, the write end address AE is set equal to the start address (address 0) and the PMA transfer flag FM and recording flag FR are respectively to OFF states.

Moreover, the disc apparatus 10 comprises an optical pickup part 15 composed of a semiconductor laser, an objective leans and a photodetector, etc. and a laser driver 16 for driving the semiconductor laser of this optical pickup part 15. A power control signal $S_{pc}$ is supplied to the laser driver 16 from the servo controller 17 which is explained later and thereby the power of laser beam emitted from the semiconductor laser of the optical pickup part 15 is controlled to be the optical power in both recording and reproducing operation modes.

To the laser driver 16, the recording video data DR is supplied from a recording data processing circuit described later during the recording operation (data writing operation). Therefore, the light intensity An modulated laser beam is output from the semiconductor laser of the optical pickup part 15 corresponding to the recording video data DR and a mark is recorded to the UDA 11a of the disc 11 corresponding to the recording video data DR. During the reproducing operation mode (data reading operation), the laser beam of constant power is continuously output from the semiconductor laser of the optical pickup part 15.

Moreover, the disc apparatus 10 has a servo controller 17 comprising the CPU (Central Processing Unit) To the servo controller 17, a focus error signal $E_p$ and tracking error signal ET generated by the well known method from the optical pickup part 15 are supplied. This servo controller 17 realizes the tracking and focus servo of the optical pickup part 15.

Moreover, under the control of the system controller described later, the servo controller 17 controls operation of the motor driver 19 for driving the sled motor 18 to control transfer of the optical pickup part 15 in the radial direction of the disc 11. Moreover, the servo controller 17 controls rotation of the spindle motor 13 via the motor driver 14 depending on the frequency signal $S_{FG}$ from the frequency generator 13. Thereby, the disc 11 is controlled to rotate at the constant linear velocity during the recording and reproducing operations.

In addition, the disc apparatus 10 is also provided with a disc eject mechanism 20 for ejecting the disc 11 from the apparatus body. Operation of this disc eject mechanism 20 is controlled by the servo controller 17 under the control of the system controller 21.

Moreover, the disc apparatus 10 is provided with a CPU and also has a system controller 21 for controlling the system as a whole and an operating part 22 which is connected to the system controller 21 to allow a user to execute various operations. The operating part 22 is provided with a power supply button for turning ON or OFF, a recording button for executing the recording operation, a reproducing button for executing the reproducing operation, a recording stop button for stopping the recording operation, an eject button for ejecting the disc 11 and a high speed eject button for ejecting the disc 11 at a high speed in the emergency mode, etc.

Moreover, the disc apparatus 10 includes an image pickup element for picking up an object image, for example, a CCD (Charged Coupled Device) solid state image pickup element 31, an image pickup lens 30 for focusing the object image on the imaging surface of the image pickup element 31 and an image pickup signal processing circuit 32 for obtaining a video signal SVr by executing the = compensating process, clamp processing, clip processing, contour compensating process, blanking pulse mixing process and synchronous signal adding process, etc. to the image pickup signal output from the image pickup element 31.

Moreover, the disc apparatus 10 also comprises an A/D converter 33 for converting the video signal SVr to the digital signal, a data compressing circuit 34 for executing the data compressing process such as MPEG2 (Moving Picture Experts Group 2), etc. to the digital video signal output from the A/D converter 33 and a recording data processing circuit 35 for adding an error correction code to the output data of the data compressing circuit 34 to obtain the recording video data DR through the data modulating process.

Moreover, the disc apparatus 10 comprises an equalizer circuit 41 for compensating for the frequency characteristic of the reproduced signal Sa from the disc 11 output from the optical pickup part 15, a data discriminator 42 for obtaining the reproduced data DP by executing the data discrimination to the output signal of the equalizer circuit 41 and a reproduced data processing circuit 43 for executing the data demodulation process and error correction process to the reproduced data DP obtained from the data discriminator 42 corresponding to the reproduced signal Sa of the UDA 11a of the disc 11.

Moreover, the disc apparatus 10 also comprises a data expanding circuit 44 for obtaining a digital video signal by executing, to the output data of the reproduced data processing circuit 43, the data expanding process which is the inverse process to the data compressing process in the data compressing circuit 34, a D/A converter 45 for converting the digital video signal into the analog signal and an output terminal 46 for outputting the video signal SVp output from the D/A converter 45.

Moreover, the disc apparatus 10 also comprises a PMA data extracting part 47 for extracting management data explained above from the reproduced data DP obtained from the data discriminator 42 depending on the reproduced signal Sa of the PMA 11b of the disc 11. The management data extracted by the PMA data extracting part 47 is then supplied to the system controller 21.

Moreover, the disc apparatus 10 also comprises an address decoder 48 for obtaining an address data AD from the reproduced data DP obtained from the data discriminator 42 depending on the reproduced signal Sa of the header of each sector of the disc 11. This address data AD is then supplied to the system controller 21 for access control during the data writing operation and data reading operation.

Moreover, the disc apparatus 10 also comprises an electronic view finder 49 which is composed of a small size cathode ray tube and a liquid crystal display element, etc., a character generator 50 for generating a character signal SEM for warning display through the control of the system controller 21, a switch circuit 51 for extracting a video signal SVr output from the pickup signal processing circuit 32 during the image pickup and recording operations and also extracting a video signal SVp output from the D/A converter 45 during the reproducing operation and an adder 52 for adding the character signal SEM explained above to the video signal SV output from the switch circuit 51 to supply these signals to the view finder 49. Switching of the switch circuit 51 is controlled by the switching control signal SW supplied from the system controller 21.

Operations of the camera-integrated disk apparatus 10 shown in FIG. 1 will be explained.

Operations during image pickup and recording operations will be explained. In this case, the switch circuit 51 is connected in the r side. The light from the imaging object (not illustrated) is supplied to the image pickup element 31 via the image pickup lens 30 and the imaging object is focused to the image pickup surface of the pickup element 31. The video signal corresponding to the imaging object output from the image pickup element 31 is supplied to the pickup signal processing circuit 22 to provide the video signal SVr through the γ compensation, clamp process, clip process, contour compensating process, blanking pulse mixing process and synchronous signal adding process, etc. This video signal SVr is supplied to the view finder 49 via the r side of the switch circuit 51 and adder 52 and the pickup image (recording image) depending on the video signal SVr is displayed on the view finder 49.

Moreover, the video signal SVr output from the image pickup signal processing circuit 32 is converted to the digital signal by the A/D converter 33 and is then supplied to the data compressing circuit 34 for data compressing process. For the data compressing circuit 34, the error correction code adding process and data modulation process are executed in the recording data processing circuit 35 to obtain the recording video data DR and this recording video data DR is supplied to the laser driver 16. Thereby, the laser beam radiated from the semiconductor laser of the optical pickup part 15 is light-intensity modulated depending on the recording video data DR and the mark is recorded in the UDA 11a of the disc 11 depending on the recording video data DR.

Next, the reproducing operation will then be explained. In this case, the switch circuit 51 is connected in the p side. The reproduced signal Sa from the optical pickup part 15 is subjected to the waveform equalizing process in the waveform equalizer 41 and thereafter it is subjected to data discrimination in the data discriminator 42 to obtain the reproduced data DP. The data demodulating process and error correcting process are executed in the reproduced data processing circuit 43 to the reproduced data DP output from the data discriminator 42 depending on the reproduced signal Sa from the UDA 11a of the disc 11 and moreover after the data expanding process in the data expanding circuit 44, the reproduced data is converted to the analog signal in the D/A converter 45 to obtain the video signal SVp.

This video signal SVp is then guided to the output terminal 46. Moreover, this video signal SVp is supplied to the view finder 49 via the p side of the switch circuit 51 and adder 52 and this view finder 49 displays the reproduced image by means of the video signal SVp.

Moreover, in this embodiment, when the recording video data DR is recorded, as explained previously, to the UDA 11a of the disc 11, writing is started from the address next to the write end address in the preceding recording operation and writing of the recording video data DR is performed in average up to the final address AL from the first address (address 0) of the UDA 11a. In addition, the repetitive write operation number NA of the recording video data DR in the UDA 11a is limited within the operation life number NL. Therefore, in this embodiment, the system controller 21 is caused to execute the following control operations during the disc loading operation, recording start operation and during the recording end operation.

Figure 4:
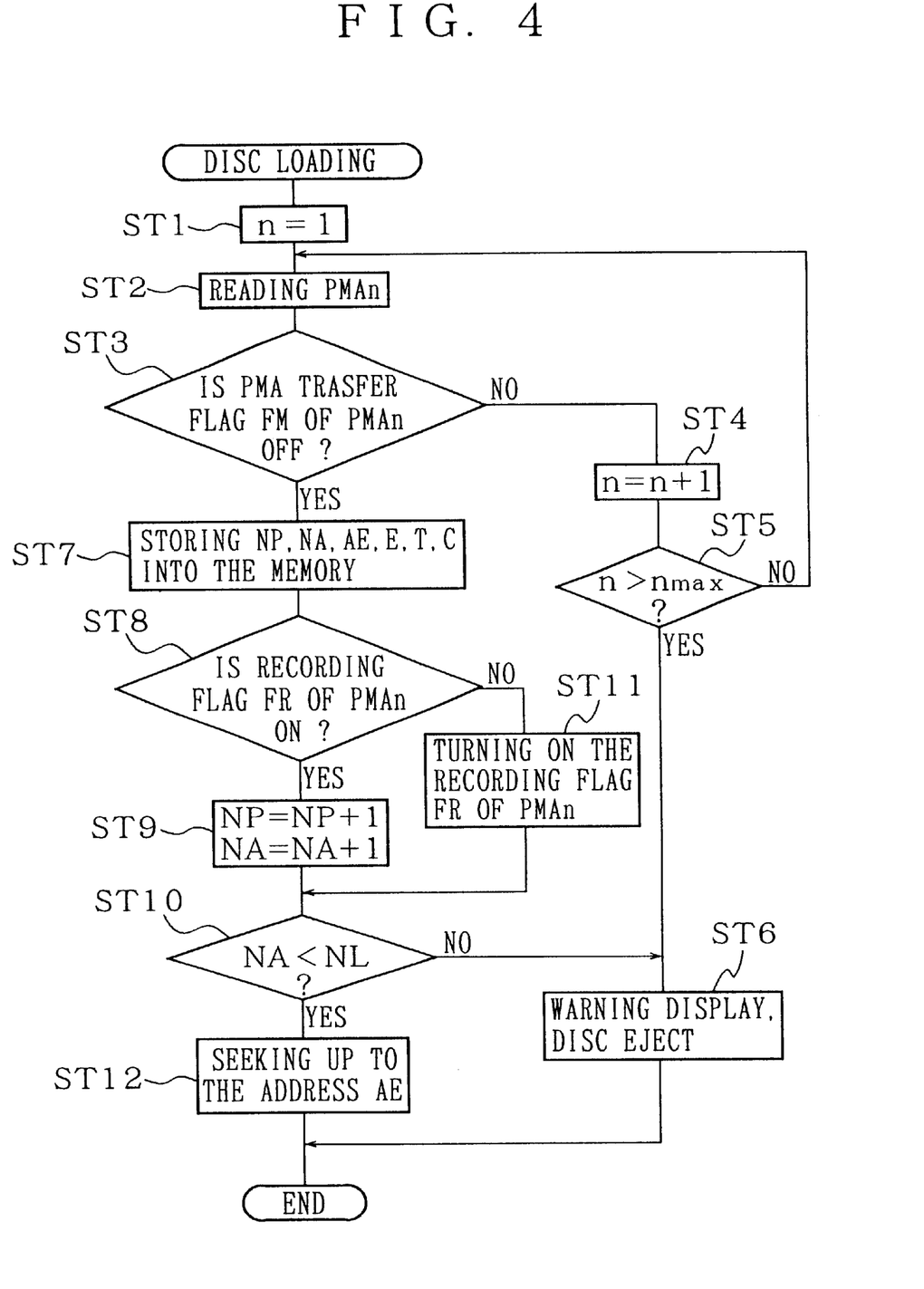
FIG. 4 is a flowchart showing control operation during the disc loading operation.

The disc loading operation will be explained with reference to the flowchart of FIG. 4.

When the disc 11 is loaded to the apparatus body by the disc loading mechanism (not illustrated), a variable n is set to 1 in the step ST1 and the management data is read from PMAn which is the nth PMA11b of the disc 11 in the step ST2. In this case, the management data is extracted by the PMA data extracting part 47 from the reproduced data DP output from the data discriminator 42 corresponding to the reproduced signal Sa from the PMAn and this management data is supplied to the system controller 21.

Next, in the step ST3, whether the PMA transfer flag FM of PMAn is in the Off state or not is determined. When this PMA transfer flag FM is in the ON state indicating that the effective PNA 11*b* is transferred to the next position, variable n is caused to show increment in the step ST4. Thereafter, whether the variable n is larger than the number of PMA 11*b* nmax in the disc 11 or not is determined in the step ST5. When n is not more than nmax, operation returns to the step ST2 and the operation explained above is repeated. Thereby, the management data written in the effective PMA 11*b* is read.

When n is more than nmax and there is no effective PMA 11*b*, operation goes to the step ST6 to execute the warning display and eject the disc 11. Here, the character signal SEM for warning display is output from the character generator 50 and is then supplied to the adder 52. Therefore, the video signal SV to which the character signal SEM for warning display is added is supplied to the view finder 49 and the characters warning that there is no effective PMA 11*b* are superimposed on the display of image on the screen of the view finder 49. Moreover, the disc 11 is ejected by controlling the disc eject mechanism 20. Here, it is also possible to execute any one of the warning display and ejection of disc.

Moreover, when the PMA transfer flag FM of PMAn is in the OFF state and the effective PMA 11*b* is not transferred to the next position in the step ST3, NP, NA, AE, etc. are read from PMAn in the step ST7 and these are stored in the memory (CPU memory) comprised in the system controller 21. In the step ST8, whether the recording flag FR of PMAn is in the ON state or not is determined. When the recording flag FR is in the ON state, NP, NA of the CPU memory are respectively caused to show increment in the step ST9 and thereafter operation goes to the step ST10. On the other hand, when the recording flag FR is in the OFF state, the recording flag FR is written in the ON state to the PMAn of the disc 11 and operation goes to the step ST10.

In the step ST10, whether the repetitive writing operation number NA of the recording video data DR for the UDA 11*a* is smaller than the operation life number NL or not is determined. When NA is smaller than NL, the sled motor 18 is controlled through the servo controller 17 and the optical pickup part 15 is sought to the position corresponding to the write end address AE of the UDA 11*a* in the step ST12. Meanwhile, when NL is not more than NA, operation goes to the step ST6 and warning display is carried out and the disc 11 is ejected. In this case, the characters warning that the repetitive write operation number NA of UDA 11*a* has reached the operation life number NL are superimposed on the image displayed on the display screen of the view finder 49. The reason why the optical pickup part 15 is sought to the position corresponding to the write end address AE of UDA 11*a* is that the writing operation is started from the address next to the write end address in the recording start operation as will be explained later. Therefore, this seek control may be executed at the time the recording start operation.

Next, the recording start operations will be explained with reference to the flowchart of FIG. 5.

When the recording start button of the operating part 22 is depressed to start the recording operation, the writing of the recording video data DR is started from the address next to the write end address AE in the step ST21. However, when the disc 11 is unused disc, the repetitive writing operation number NA is 1 and the write end address AE is address 0, data writing is started from the address 0.

In the step ST22, whether or not recording is made up to the final address AL of UDA 11*a* is determined. When recording is completed to the final address AL, the optical pickup part 15 is controlled to seek up to the position corresponding to the first address (address 0) in the step ST23. In the step ST24, data writing is started from the first address. In the step ST25, NA in the CPU memory is incremented and thereafter operation returns to the step ST22. Thereby, on the occasion of recording the recording video data DR to UDA 11*a* of the disc 11, data writing is started from the address next to the write end address AE in the preceding recording operation and the repetitive writing operation number NA is incremented for each operation that recording is made up to the final address AL and the writing is started again from the first address.

Figure 5:
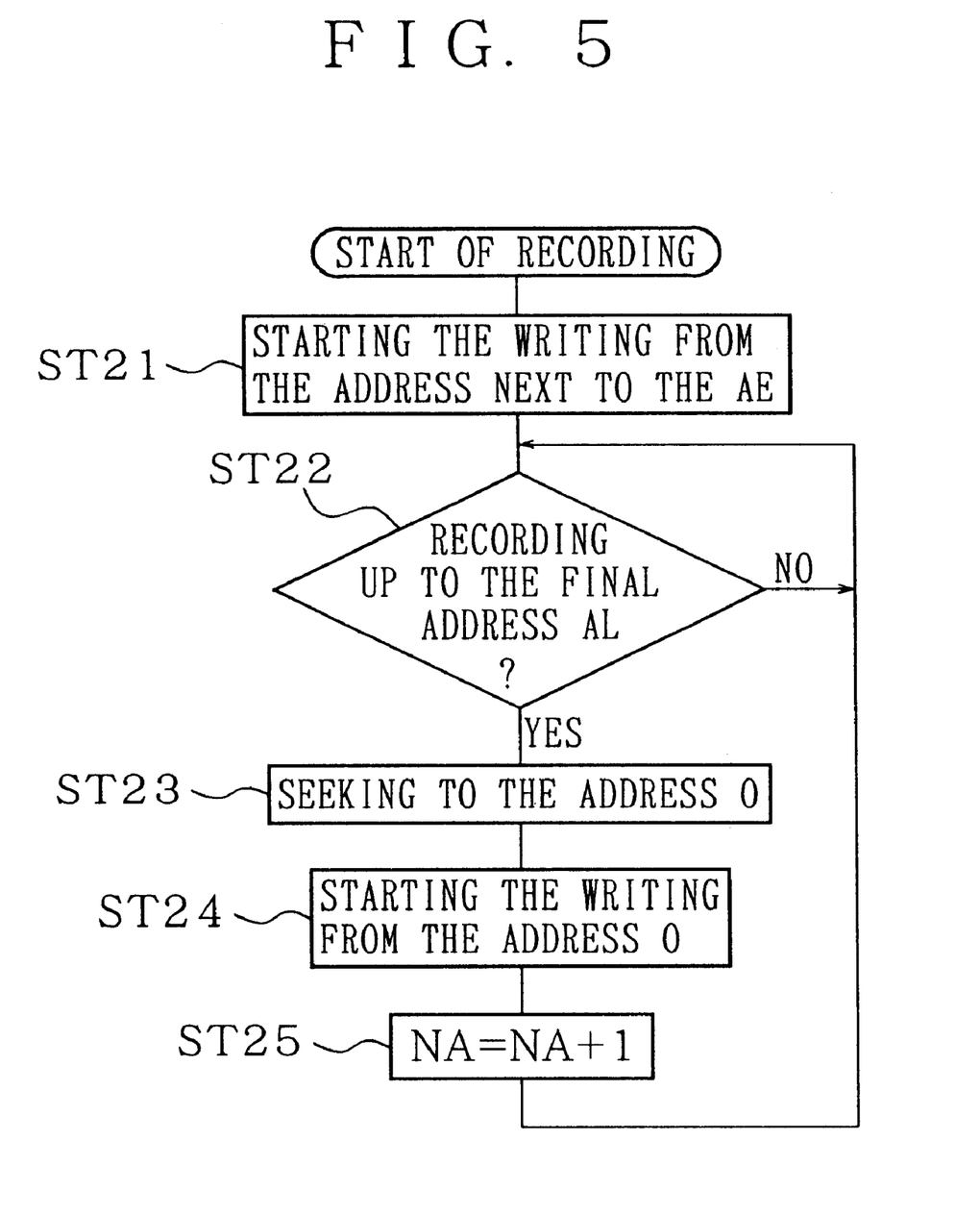
FIG. 5 is a flowchart showing control operation during the recording start operation.

The flowchart shown in FIG. 5 is terminated by interruption effectuated when the recording end button of the operating part 22, eject button and moreover high speed eject button are depressed.

Figure 6:
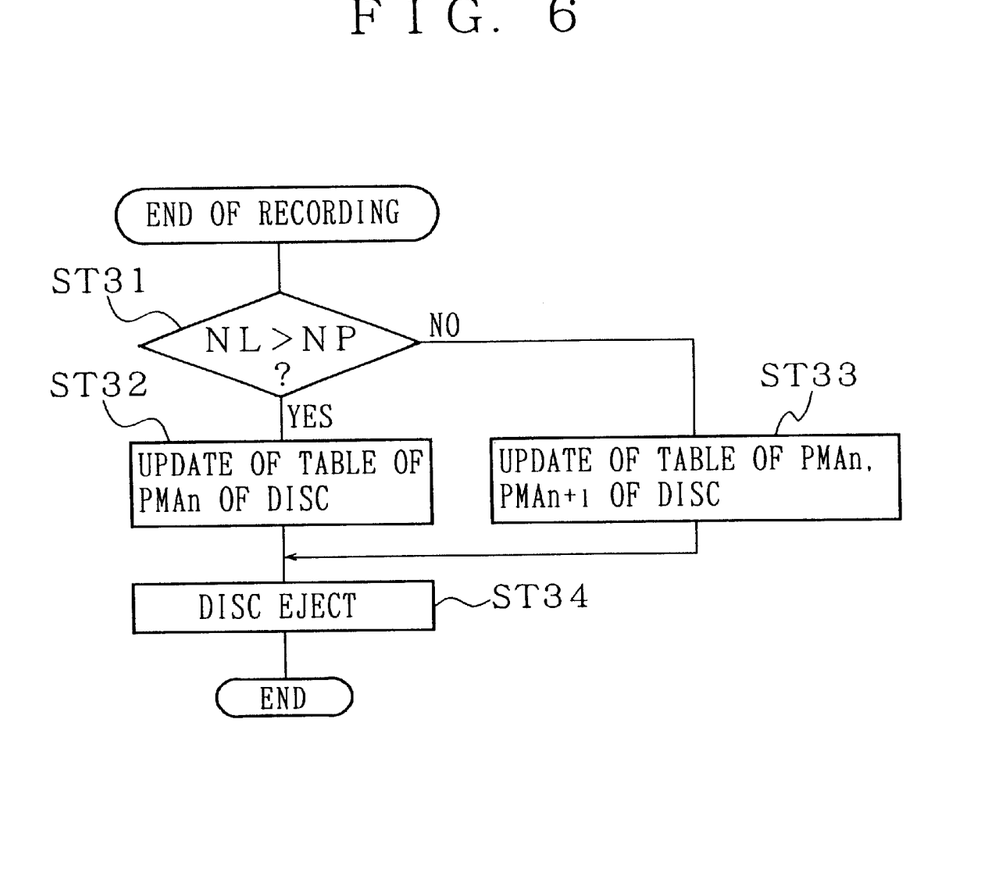
FIG. 6 is a flowchart showing control operation during recording end operation by operations of the recording stop button and eject button.

The recording end operation by the recording end button and eject button will be explained with reference to the flowchart of FIG. 6.

When recording operation is terminated by depressing the recording end button and the eject button, whether the write operation number NP of the management data for PMAn is smaller than the operation life number NL or not is determined in the step ST21. When NP is less than NL, the table of PMAn of disc 11 is updated in the steps ST32. That is, NP of the CPU memory is incremented and such data is overwritten in the writing position of NP of PMAn, data of NA of the CPU memory is overwritten in the write position of NA of PMAn, the data of write end address AE of UDA 11*a* is overwritten in the writing position of AE of PMAn and the recording flag FR of PMAn is set to the OFF state.

On the other hand, when NL is not more than NP, namely when PMAn is used up to its operation life, the PMA transfer flag FM of PMAn of the disc 11 is set to ON state and the table of $PMA_{n+1}$ is updated. That is, the NA data of CPU memory is written in the NA writing position of $PMA_{n+1}$ and the data of the write end address AE of UDA 11*a* is written in the writing position of AE of $PMA_{n+1}$.

When the recording operation is completed by the recording end button, operation is completed by updating of the table in the step ST32 or ST33, but when the recording operation is completed by depressing the eject button, the operation is completed when the disc 11 is ejected from the apparatus body with the disc eject mechanism 20 in the step ST34.

Figure 7:
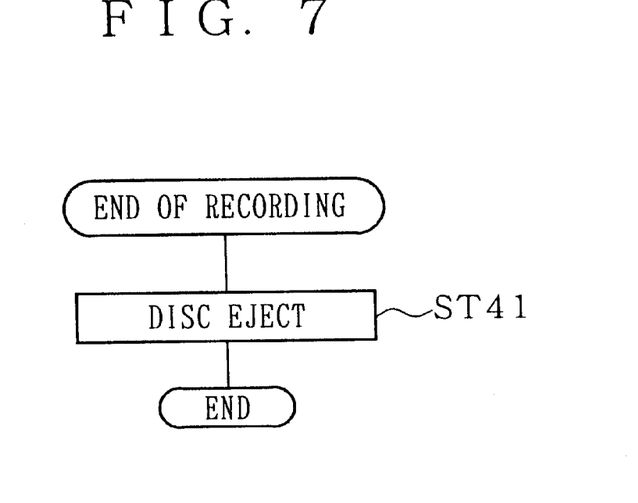
FIG. 7 is a flowchart showing control operation during recording end operation by operations of the high speed eject button.

Next, recording end operation by the high speed eject button will be explained with reference to the flowchart of FIG. 7.

When the recording operation is completed by depressing the high speed eject button, the disc 11 is ejected from the apparatus by means of the disc eject mechanism 20 in the step ST41. In this case, the disc 11 is immediately ejected without rewriting the table of $PMA_n$ and $PMA_{n+}$of the disc 11 and the disc 11 can be ejected within the short period.

In this embodiment, as explained above, on the occasion of recording the recording video data DR to UDA 11*a* of the disc 11, data writing is started from the address next to the write end address AE in the preceding recording operation and, after recording is made up to the final address AL, data writing is started again from the start address and thereby the recording video data DR can be written in average up to the final address from the start address of UDA 11*a* of the disc 11 to thereby expand the operation life of the disc 11.

Moreover, when the repetitive writing operation number NA of the recording video data DR in UDA 11*a* of the disc 11 exceeds the operation life number NL at the time of loading the disc 11, since the warning display is executed and the disc 11 is ejected from the apparatus, writing of the recording video data DR to the UDA 11a is avoided and safety for writing of the recording video data DR to the UDA 11a can be assured.

In addition, when two or more PMAs 11b are provided on the disc 11 and the repetitive writing operation number NP of the management data to the PMA 11b exceeds the operation life number NL, the next PMA 11b is used as the effective one. Although the operation number NP of the management data to PMA 11b becomes larger than the repetitive writing operation number NA to UDA 11a, the safety of the management data to be written to the PMA 11b can be assured by providing two or more PMAs 11b and the effective PMA11b is sequentially transferred.

In addition, the recording flag FR is written to the PMA 11b of the disc 11 and on the occasion of loading the disc 11, when the recording flag FR is in the ON state, correction is made so that the repetitive write operation number NA in the UDA 11a written into the PMA 11b and writing operation number NP of the management data to the PMA 11b are incremented by one respectively and when the recording flag FR is in the OFF state, the recording flag FR is set to the ON state. Thereby, it is possible, in the case that the recording operation is completed by depressing the high speed eject button, to recover the problem that the values of NP, NA written in the PMA 11b are smaller than the actual values when the disc 11 is ejected from the apparatus without updating of the management data to the PMA 11b.

In the embodiment explained above, the present invention has been applied to the camera-integrated disc apparatus 10 in which the phase change type disc 11 is used as the recording medium, but the present invention can also be applied in the same manner to a recording apparatus utilizing reprogrammable disc type recording medium such as magnetic disc and magneto-optical disc, etc. and also to a disc apparatus utilizing another reprogrammable recording medium such as tape type recording medium like a magnetic tape, etc.

Moreover, in the embodiment explained above, a warning is displayed using characters on the view finder but the warning can also be issued with display of a warning lamp and a voice message in place of character play.

The recording medium driver of the present invention writes the real data write end address and real data write number information in the real data area of a recording medium into the management data area and thereby it can write in average the real data up to the final address from the start address of the real data area to extend the operation life of the recording medium and also can assure the safety of real data writing to the real data area by easily obtaining the repetitive write operation number information of the real data area.

What is claimed is:

1. A recording medium driver for driving a reprogrammable recording medium having a real data area with a start address and a final address up to which real data is written and a management data area to which management data is written, comprising:

writing means for writing said real data to said real data area and said management data to said management data area of said recording medium;

reading means for reading said management data from said management data area of said recording medium; and control means for writing, following the writing of real data up to a write end address of said real data area, subsequent real data from an address next to the write end address, and for writing a write end address indicating the end of a write operation to said management data area as management data with said writing means after the end of each writing of real data to said real data area, and for writing, following the writing of real data from the start address up to the final address of said real data area, a real data writing operation number information indicating the number of times of writing real data up to the final address into said management data area as management data with said writing means, and for causing writing of subsequent real data from the start address of said real data area when real data has been written from the start address up to the final address of said real data area.

2. The recording medium driver according to claim 1, further comprising memory means for temporarily storing the management data read by said reading means, and wherein said control means causes said reading means to read said management data and then stores such management data to said memory means prior to the writing of real data to said real data area, and also updates said real data writing operation number information stored in said memory means.

3. The recording medium driver according to claim 1, further comprising warning means, and wherein said control means causes said reading means to read said management data prior to writing of real data to said real data area and also causes said warning means to issue a warning that said number of times of writing operation exceeds a predetermined number of times when the number of times of write operation indicated by said real data writing operation number information exceeds the predetermined number of times.

4. The recording medium driver according to claim 3, wherein said control means causes said reading means to read said management data during loading of said recording medium.

5. The recording medium driver according to claim 3, further comprising transferring means for transferring said writing means to a predetermined region of said recording medium, and wherein said control means transfers said writing means to the area next to said write end address when the number of times of writing operation indicated by said real data writing operation number information is under said predetermined cumber of times.

6. The recording medium driver according to claim 1, further comprising a recording medium driver body and an eject means for ejecting said recording medium from the recording medium driver body, and wherein said control means causes said reading means to read said management data prior to the writing of said real data into said real data area and causes said eject means to eject said recording medium from said recording medium driver body when the number of times of write operation indicated by said real data writing operation number information exceeds the predetermined number of times.

7. The recording medium driver according to claim 6, wherein said control means causes said reading means to read said management data during loading of said recording medium.

8. The recording medium driver according to claim 6, further comprising transfer means for transferring said writing means to a predetermined region of said recording medium, and wherein said control means causes said transfer means to transfer said writing means to the area next to said write end address when the number of times of write operation indicated by said real data writing operation number information is under said predetermined number of times.

9. The recording medium driver according to claim 2, further comprising recording end instructing means for instructing the end of recording of said real data to said real data area, and wherein said control means controls said writing means to write the management data stored in said memory means to said management data area when the end of recording of said real data is instructed by said recording end instructing means.

10. The recording medium driver according to claim 1, further comprising an recording medium driver body and eject means for ejecting said recording medium from the recording medium driver body, and wherein said control means causes said writing means to write, as said management data, the management data writing number information indicating the number of times of writing said management data to said management data area prior to ejection of said recording medium from the recording medium driver body by said eject means.

11. The recording medium driver according to claim 2 further comprising:

loading means for loading said recording medium to the recording medium driver and ejecting said recording medium therefrom; and high speed eject means for ejecting at a high speed said recording medium from said recording medium driver, and wherein said control means controls said writing means to write flag information indicating the first state to said management data area of said recording medium as said management data prior to the ejection of the medium when said medium is ejected by means of said loading means and ejects said recording information without writing said flag information to said medium when said medium is ejected by said high speed eject means, and said control means also controls said writing means to update said flag information recorded in said management data area of said recording medium to indicate the second state when said flag information indicates the first state during the loading of the medium by said loading means and updates the value of the real data writing operation number information stored in said memory means as said management data to a value showing increment of one when said flag information indicates said second state.

12. A recording medium driver for driving a reprogrammable recording medium having a real data area to which real data is written and at least two management data areas to which management data is written, comprising:

writing means for writing said real data to said real data area and said management data to said management data areas of said recording medium;

reading means for reading said management data from said management data area of said recording medium; and control means for administering management data writing number information for each management data area and controlling said writing means to write said management data writing number information to another management data area when the number of times indicated by the management data writing number information of one of the management data areas exceeds a predetermined number of times.

13. A recording medium driver comprising:

an image pickup element;

a pickup signal processing means for obtaining a video signal by processing the pickup signal obtained from said image pickup element; and a data recording means for recording data to a removable recording medium having a real data area with a start address and a final address up to which video data corresponding to said video signal can be written and a management data area to which management data can be written;

wherein said data recording means comprises:

writing means for writing said video data to said real data area and said management data to said management data area of said recording medium;

reading means for reading said management data from said management data area of said recording medium; and control means for writing, following the writing of video data up to a write end address of said real data area, subsequent video data from an address next to the write end address, and for writing a write end address indicating the end of a write operation to said management data area as management data with said writing means after the end of each writing of video data to said real data area, and for causing said writing means to write, following the writing of video data from the start address MR to the final address of said real data area, a real data writing operation number information indicating the number of times of writing video data up, to the final address into said management data area as management data with said writing means, and for causing writing of subsequent video data from the start address of said real data area when video data has been written from the start address up to the final address of said real data area.

* * * * *

UNITED STATES PATENT AND TRADEMARK OFFICE
CERTIFICATE OF CORRECTION

PATENT NO.     : 6,246,829 B1
DATED          : June 12, 2001
INVENTOR(S)    : Kenzo Nakagawa It is certified that error appears in the above-identified patent and that said Letters Patent is hereby corrected as shown below:

Column 1,
Line 8, after "example" insert a comma.

Column 2,
Line 41, change "an" to -- a --.

Column 3,
Line 19, change "SFG" to -- $S_{FG}$ --.
Line 59, change "describe" to -- described --.
Line 67, change "leans" to -- lens --.

Column 4,
Line 11, delete "An".
Line 22, change "ET" to -- $E_T$ --.
Line 60, change "=" to -- $\gamma$ --.

Column 7,
Line 21, change "display." to -- displays --.
Line 54, after "time" insert -- of --.

Column 8,
Line 54, change "$PMA_{n+}$" to -- $PMA_{n+1}$ --.

Column 9,
Line 41, after "finder" insert -- 49 --.
Line 43, change "play" to -- display --.

Column 10,
Line 47, change "cumber" to -- number --.

Column 11,
Line 17, change "an" to -- a --.

UNITED STATES PATENT AND TRADEMARK OFFICE
CERTIFICATE OF CORRECTION

PATENT NO. : 6,246,829 B1
DATED : June 12, 2001
INVENTOR(S) : Kenzo Nakagawa

It is certified that error appears in the above-identified patent and that said Letters Patent is hereby corrected as shown below:

<u>Column 12,</u>
Line 44, change "MR" to -- up --.
Line 47, delete the comma.

Signed and Sealed this

Twenty-eighth Day of May, 2002

*Attest:*

*Attesting Officer*

JAMES E. ROGAN
*Director of the United States Patent and Trademark Office*